US006779225B1

(12) United States Patent
Bellarosa, III

(10) Patent No.: US 6,779,225 B1
(45) Date of Patent: Aug. 24, 2004

(54) MOP BUCKET WITH WHEELS AND WHEEL COVERS

(76) Inventor: Raymond Bellarosa, III, P.O. Box 191, Marlborough, CT (US) 06447

(*) Notice: Subject to any disclaimer, the term of this patent is extended or adjusted under 35 U.S.C. 154(b) by 240 days.

(21) Appl. No.: 09/888,796

(22) Filed: Jun. 25, 2001

(51) Int. Cl.[7] ............................................. A47L 13/58
(52) U.S. Cl. ......................................... 15/260; 15/264
(58) Field of Search ................. 15/260–264; 16/18, 16/40

(56) References Cited

U.S. PATENT DOCUMENTS 1,219,017 A * 3/1917 Maclin ........................ 220/772
4,344,201 A * 8/1982 Trisolini .......................... 15/3
5,806,867 A * 9/1998 Hampton .................. 280/47.34

FOREIGN PATENT DOCUMENTS

| EP | 0 906 745 | * | 4/1999 |
| FR | 2 823 964 | * | 10/2002 |
| JP | 2000-217763 | * | 8/2000 |

* cited by examiner

Primary Examiner—Terrence R. Till
(74) Attorney, Agent, or Firm—John F. A. Earley; John F. A. Early, III; Harding, Earley, Follmer & Frailey

(57) ABSTRACT

A mop bucket with wheels having covers protecting the wheels against contact with any liquid running down the sidewalls of the bucket and onto the wheels, axles, and swivels, and for preventing the liquid form picking up rust from the wheels and running onto the floor and staining it.

5 Claims, 3 Drawing Sheets

MOP BUCKET WITH WHEELS AND WHEEL COVERS

BACKGROUND OF THE INVENTION

1. Field of the Invention

This invention relates to mop buckets with wheels that are useful in mopping (i.e., washing, waxing, etc.) floors.

2. Description of the Prior Art

A problem with current wheeled mop buckets is that water and other liquids spill, splashed and run down the sides of the bucket and rust the bearings and axles of the wheels. Liquid wax may also run down the sides of the bucket onto the wheels, dry, and seize, preventing the wheels from rolling or swivelling. Also, the liquid may pick up rust from the wheels and run onto the floor and stain it which presents the problem of removing the stain.

SUMMARY OF THE INVENTION

It is an object of the invention to prevent wax and other liquids from contacting the wheels of a mop bucket, and it is an object to prevent the wheels from seizing.

It is another object of this invention to prevent wax and other liquids from picking up rust from the bucket wheels and dripping onto the floor and staining it.

It is another object of the invention to direct the liquid from the bucket away from the axles and bearings of the wheels, and thus protect the axle and bearings from seizure.

It is another object of the invention to provide a cover for the wheels so that any liquid which is splashed or spilled from the bucket runs down the sides of the bucket and onto the floor, safely passing by the bearings, swivel, axle, and wheel. Thus the bearings and axle stay dry and lubricated, eliminating rust, seizure, and stains.

DETAILED DESCRIPTION OF THE DRAWINGS

Figure 1:
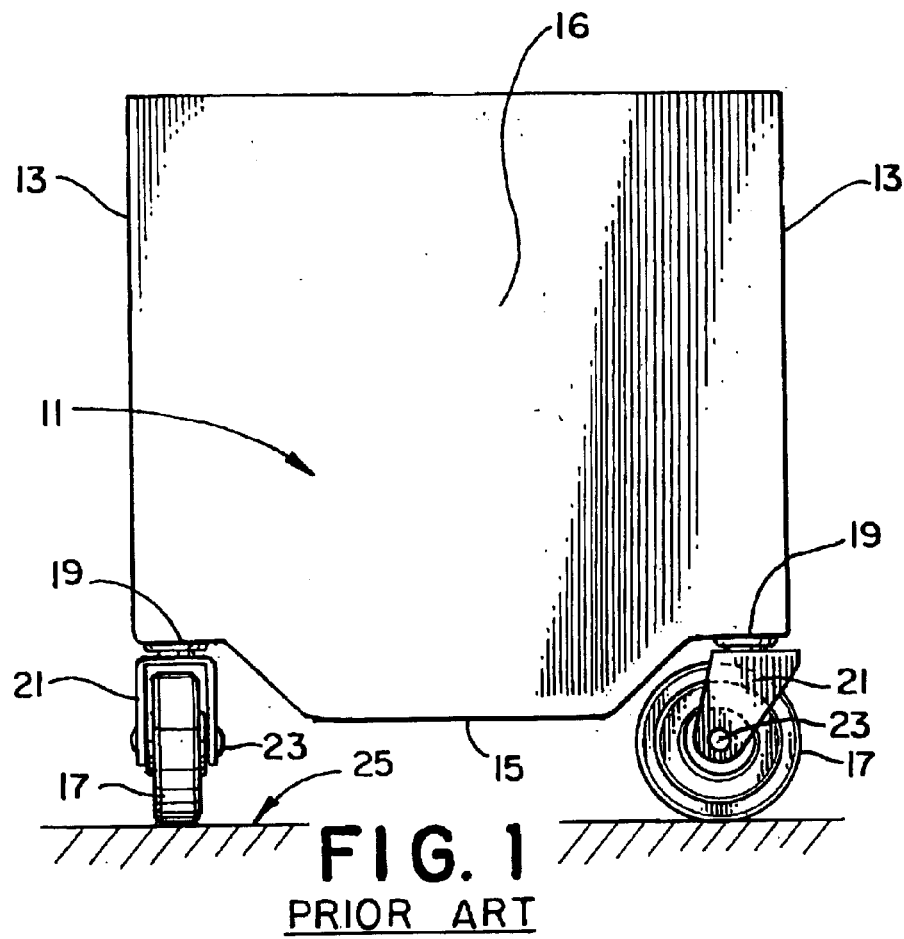
FIG. 1 is a view in side elevation of a prior art mop bucket showing how the wheel swivel and axle may become corroded and rusted.

Turning now to the drawings, there is shown in FIG. 1 a mop bucket 11 which is illustrative of the prior art. It comprises sidewalls 13 that are connected together and are connected to a bottom wall 15 to form a cup 16 for holding cleaning or waxing liquid which is to be applied to a floor 25 to clean and/or wax it. A number of wheels 17 are mounted on the bottom wall 15 at the corners 19 of the bucket 11 to enable the bucket 11 to be moved easily across the floor from spot to spot.

A swivel 21 connects the wheels 17 to the bottom wall 15 of the mop bucket 11 to allow the wheels to swivel, and the wheels 17 are rotatable about an axle 23 to allow the bucket 11 to roll.

Figure 2:
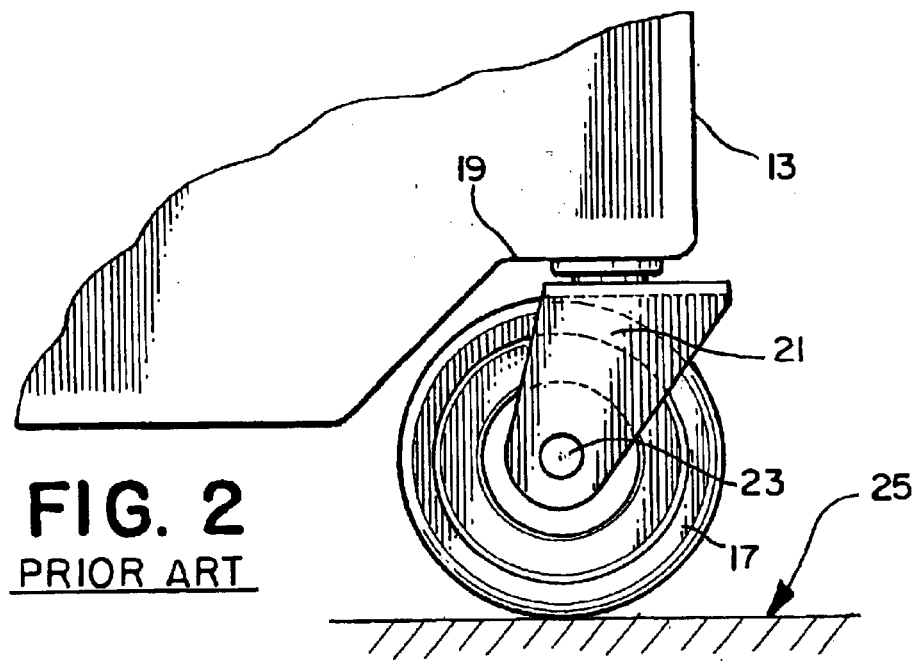
FIG. 2 is an enlarged view in side elevation of one of a wheel of FIG. 1.

As is seen most clearly in FIG. 2, water and other liquids have run down the sidewalls 13 of the prior art mop bucket 11 and has corroded and rusted the swivel 21 and the axle 23 of the wheels 17 which prevents the wheel 17 from rolling and swivelling. Also rust from the wheel 17 has run down with the liquid wax and has stained the floor 25.

Figure 3:
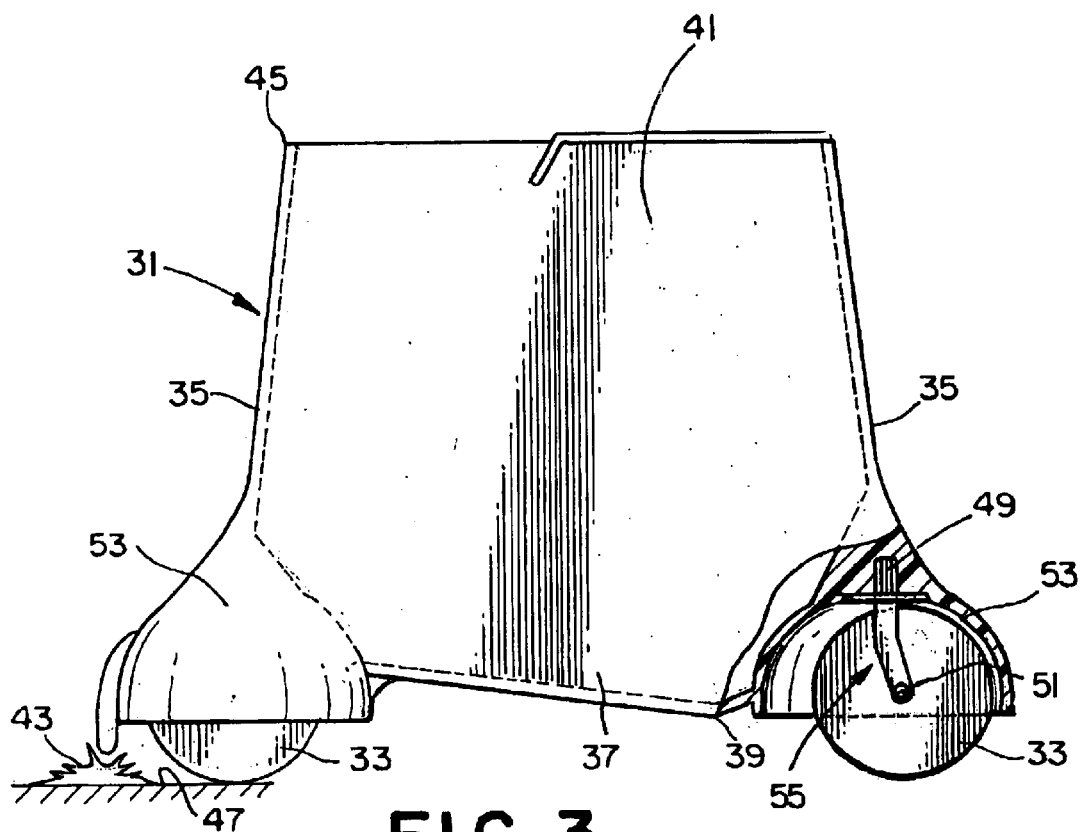
FIG. 3 is a view in side elevation of a mop bucket constructed in accordance with this invention.
Figure 4:
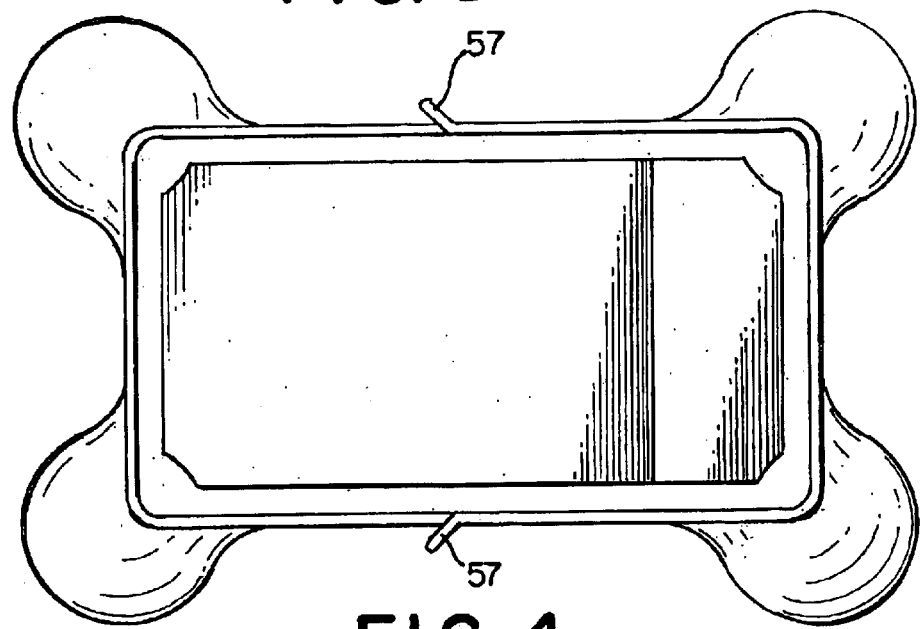
FIG. 4 is a view in top plan of the mop bucket of FIG. 3.
Figure 5:
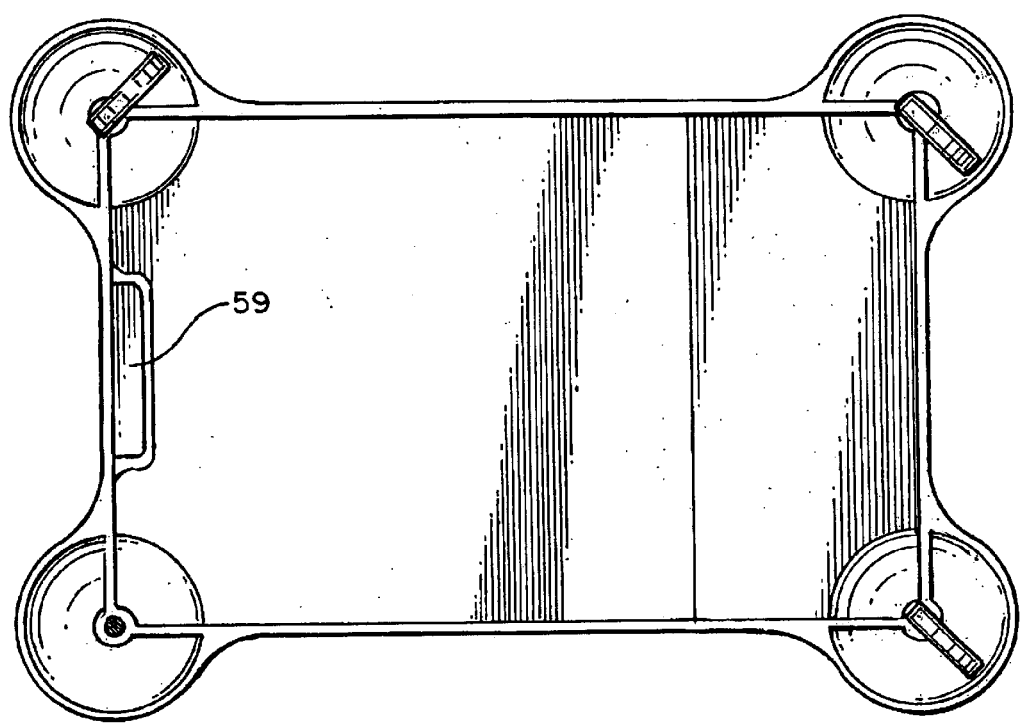
FIG. 5 is a view in bottom plan of the mop bucket of FIGS. 3 and 4, but with one wheel removed.

Turning now to the invention, FIGS. 3–5 show a mop bucket 31 constructed in accordance with the invention for mopping (washing and waxing) floors. Mop bucket 31 has four wheels 33 that are protected against the liquid in the bucket from running down the sidewalls 35 of the bucket 31 onto the wheels 33 and causing rust and corrosion and binding the wheels 33 to prevent the wheels 33 from rolling and swivelling and to prevent liquid and rust from the wheels 33 from running onto the floor and staining it.

Mop bucket 31 comprises sidewalls 35 connected at their bottom portions 37 to a bottom wall 39 to form a cup 41 for holding cleaning or waxing liquid 43.

A number of wheels 33, four in the drawings, are spaced apart at the corners 45 of the mop bucket 31 to enable the mop bucket 31 to be moved easily on the floor 47.

A swivel 49 connects the wheels 33 to the bottom wall 39 of the mop bucket 31 to enable the wheels to swivel.

The wheels 33 are mounted on axles 51 which enable the wheels 33 to roll.

Covers 53 extend from the mop bucket 31 for covering the wheels 33 and preventing any liquid in the bucket 31 from running down the sidewalls 35 of the mop bucket 31 onto the wheels 33, axles 51, and swivels 49 and for preventing the liquid from picking up rust from the wheels 33 and wheel assemblies 55 and running onto the floor to stain it.

Mop bucket 31 includes four sidewalls 35 that have vertical edges connected together at right angles to form four corners 45 and four wheels 33 connected to the bottom wall 39 at the corners 45, and four covers 53 with each cover 53 extending from a corner 45 over a wheel 33. The covers 53 extend from the bottom portion 37 of the sidewall 35 and from the bottom wall 39.

In operation the mop bucket 31 is filled with a cleaning or waxing liquid 43 and is moved to the section of the floor 47 which is to be cleaned and/or waxed. A mop is inserted into the mop bucket 31 and moved around to absorb the liquid and is removed and swabbed around the floor. In the process of removing the mop, some liquid 43 is spilled and runs down the sidewalls 35 onto the floor, but the liquid 43 runs by or over the covers 53 and does not contact the wheel assemblies 55 of wheel 33, axle 51 and swivel 49 and therefore avoids corroding or seizing those parts so that the mop bucket 31 is free to roll and swivel and go to another part of the floor to be cleaned or waxed.

The method of the invention for protecting the wheel assemblies 55 of wheel 33, swivel 48 and axles 51 against rust and seizure comprises the steps of moving a mop bucket 31 to a position on a floor 25, pouring a liquid 43 into the mop bucket 31, inserting a mop into the mop bucket 31 containing the liquid 43, moving or swishing the mop around in the liquid 43 in the mop bucket 31 to pick up liquid, spilling some liquid 43 out of the mop bucket 31 and causing the liquid 43 to run down the sidewalls 35 of the mop bucket 31, diverting the liquid 43 away from the wheel assemblies 55 of the mop bucket 31 so that the liquid 43 makes no contact with the wheel assemblies 55, and allowing the liquid to fall to the floor, thereby preventing rust and seizure of the wheel assemblies 55.

Mop bucket 31 is provided with an upper handle 57 and a bottom handle 59 to help in lifting the bucket 31.

What is claimed is:

1. The invention claimed is a mop bucket for mopping washing, or waxing floors, the mop bucket having wheels that are protected against the liquid in the bucket from running down the sidewalls of the bucket onto the wheels and causing rust and corrosion and binding of the wheels to prevent the wheels from rolling and swiveling and to prevent liquid and rust from the wheels from running onto the floor and staining it, comprising a sidewall with a bottom portion connected at its bottom portion to a bottom wall to form a cup for holding cleaning or waxing liquid, a number of spaced apart wheels mounted on the bottom wall for enabling the bucket to be moved easily on the floor from spot to spot, swivel means connecting the wheels to the bottom wall of the bucket to enable the wheels to swivel, axle means connected to the wheels for enabling the wheels to roll, and covers extending from the bucket for covering the wheels and preventing any liquid in the bucket from running down the sidewalls of the bucket and onto the wheels, axles, and swivels and for preventing the liquid from picking up rust from the wheels and running onto the floor to stain it.

2. The invention claimed is the mop bucket of claim 1, including four sidewalls having edges connected together at right angles to form four corners, four wheels connected to the bottom wall at the corners, and four covers with each cover extending from a corner and over a wheel.

3. The invention claimed is the mop bucket of claim 2, said covers extending from the bottom portion of the sidewalls and from the bottom wall.

4. The invention claimed is a mop bucket for mopping floors, the mop bucket having wheels that are protected against the liquid in the bucket from running down the side of the bucket onto the wheels and causing rust and corrosion and binding the wheels to prevent the wheels from rolling and swiveling and to prevent liquid and rust from the wheels from running onto the floor and staining it, comprising four sidewalls having edges connected together to form four corners, the four sidewalls having bottom portions connected to a bottom wall to form a cup for holding cleaning or waxing liquid, four wheels connected to the bottom wall at the corners to enable the bucket to be rolled easily on the floor from spot to spot, swivel means connected to the wheels to enable the wheels to swivel, axle means connected to the wheels to enable the wheels to roll, and covers extending from the four corners of the bucket to cover the wheels and prevent any liquid in the bucket from running down the sidewalls of the bucket and onto the wheels, axles and swivels and for preventing the liquid from picking up rust from the wheels and running onto the floor and staining it.

5. The invention claimed is a method of protecting the wheel assemblies of a mop bucket against rust and seizure comprising the steps of moving the mop bucket to a position on a floor, pouring a liquid into the mop bucket, inserting a mop into the mop bucket containing the liquid, moving the mop around in the liquid in the mop bucket to absorb the liquid, spilling some liquid out of the mop bucket and causing the liquid to run down the sidewalls of the bucket, providing covers extending from the four corners of the bucket to cover the wheel assemblies, diverting the liquid away from the wheel assemblies of the mop bucket over the covers so that the liquid makes no contact with the wheel assemblies, and allowing the liquid to fall to the floor, thereby preventing rust and seizure of the wheel assemblies.

\* \* \* \* \*